US008549422B2

(12) United States Patent  
Gutha et al.

(10) Patent No.: US 8,549,422 B2  
(45) Date of Patent: Oct. 1, 2013

(54) GRAPHICAL APPROACH TO SETUP DATA SHARING BETWEEN TWO CONTROLLERS

(75) Inventors: Stalin Gutha, Bangalore (IN); Janaki Krishnaswamy, Bangalore (IN); Lavanya Bhadriraju, Bangalore (IN); Ankur Jhawar, Bangalore (IN); Kevin B. Moore, Chaska, MN (US); Subramanya Nagaraj, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 418 days.

(21) Appl. No.: 12/650,385

(22) Filed: Dec. 30, 2009

(65) Prior Publication Data

US 2011/0161850 A1    Jun. 30, 2011

(51) Int. Cl.  
*G06F 3/048* (2013.01)

(52) U.S. Cl.  
USPC .......................................... 715/769; 715/826

(58) Field of Classification Search  
USPC .................. 715/769, 826; 700/1, 19, 162  
See application file for complete search history.

(56) References Cited

U.S. PATENT DOCUMENTS

| | | | | | |
|---|---|---|---|---|---|
| 5,732,086 | A | * | 3/1998 | Liang et al. | 370/410 |
| 6,041,049 | A | * | 3/2000 | Brady | 370/351 |
| 6,061,740 | A | * | 5/2000 | Ferguson et al. | 709/246 |
| 6,119,125 | A | * | 9/2000 | Gloudeman et al. | 1/1 |
| 6,151,624 | A | * | 11/2000 | Teare et al. | 709/217 |
| 6,188,675 | B1 | * | 2/2001 | Casper et al. | 370/254 |
| 6,493,003 | B1 | * | 12/2002 | Martinez | 715/781 |
| 6,931,622 | B1 | * | 8/2005 | Aldrich et al. | 717/107 |
| 7,062,718 | B2 | * | 6/2006 | Kodosky et al. | 715/771 |
| 7,076,736 | B2 | * | 7/2006 | Hugh | 715/743 |
| 7,076,739 | B2 | * | 7/2006 | Yasuda | 715/769 |
| 7,139,979 | B2 | * | 11/2006 | Schultz et al. | 715/763 |
| 7,159,185 | B1 | * | 1/2007 | Vedula et al. | 715/763 |
| 7,240,288 | B2 | * | 7/2007 | Allor et al. | 715/736 |
| 7,761,563 | B2 | * | 7/2010 | Shike et al. | 709/224 |
| 2005/0107998 | A1 | * | 5/2005 | McLernon et al. | 703/22 |
| 2005/0230490 | A1 | | 10/2005 | Pouchak et al. | |
| 2006/0058900 | A1 | * | 3/2006 | Johanson et al. | 700/83 |
| 2008/0004754 | A1 | | 1/2008 | Pouchak et al. | |
| 2008/0010049 | A1 | * | 1/2008 | Pouchak et al. | 703/14 |

(Continued)

OTHER PUBLICATIONS

Honeywell, Honeywell Spyder User's Guide, @ 2007, pp whole document.*

(Continued)

*Primary Examiner* — Phenuel Salomon  
(74) *Attorney, Agent, or Firm* — Seager Tufte & Wickhem LLC.

(57) ABSTRACT

A graphical approach to setup data sharing between two controllers. Symbols that represent controllers may be placed on a wiresheet. A link may be constructed between the controllers by connecting the symbols with a line drawn between them. The resulting link information may lead to a compile and download of binding tables to the pertinent controller. The designer or user need not setup several levels of mapping by populating multiple tables to effect the binding for a link between the controllers. This binding may be done automatically under a hood without the designer or user needing to be aware of the binding activity. This approach for graphically constructing a link may be particularly applicable to BACnet controllers.

10 Claims, 6 Drawing Sheets

(56) References Cited

U.S. PATENT DOCUMENTS

| | | |
|---|---|---|
| 2008/0015739 A1 | 1/2008 | Wacker |
| 2008/0016493 A1 | 1/2008 | Pouchak et al. |
| 2008/0115153 A1 | 5/2008 | Brindle |
| 2008/0125914 A1 | 5/2008 | Wacker |
| 2009/0113037 A1 | 4/2009 | Pouchak |
| 2009/0192645 A1* | 7/2009 | Govindaraj et al. .......... 700/110 |
| 2009/0287736 A1* | 11/2009 | Shike et al. ............... 707/103 R |
| 2010/0100583 A1 | 4/2010 | Pouchak |

OTHER PUBLICATIONS

Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.
Honeywell Spyder Bacnet User's Guide, 242 pages, Revised Jul. 2009.
Honeywell Spyder User's Guide 202 pages, Released Jul. 2007.
Siemens, BACnet for DESIGO 27 Pages, prior to Dec. 30, 2009.

* cited by examiner

GRAPHICAL APPROACH TO SETUP DATA SHARING BETWEEN TWO CONTROLLERS

RELATED APPLICATIONS

Related co-pending applications include application Ser. No. 12,650,447, filed Dec. 30, 2009, entitled "A Mechanism for Constructing Generic Control Logic including Versions in Various Protocols"; application Ser. No. 12/650,467, filed Dec. 30, 2009, entitled "Protocol Independent Programming Environment"; application Ser. No. 12/650,476, filed Dec. 30, 2009, entitled "Priority Selection Mechanism for Driving Outputs from Control Logic for Controllers of Various Protocols"; application Ser. No. 12/650,485, filed Dec. 30, 2009, entitled "An Approach to Automatically Encode Application Enumeration Values to Enable Reuse of Applications across Various Controllers"; application Ser. No. 12/650,497, filed Dec. 30, 2009, entitled "An Approach for Switching between Point Types without Affecting Control Logic"; and application Ser. No. 12/650,513, filed Dec. 30, 2009, entitled "Changeable BACnet Interface".

Application Ser. No. 12,650,447, filed Dec. 30, 2009, entitled "A Mechanism for Constructing Generic Control Logic including Versions in Various Protocols", is hereby incorporated by reference. Application Ser. No. 12/650,467, filed Dec. 30, 2009, entitled "Protocol Independent Programming Environment", is hereby incorporated by reference. Application Ser. No. 12/650,476, filed Dec. 30, 2009, entitled "Priority Selection Mechanism for Driving Outputs from Control Logic for Controllers of Various Protocols", is hereby incorporated by reference. Application Ser. No. 12/650,485, filed Dec. 30, 2009, entitled "An Approach to Automatically Encode Application Enumeration Values to Enable Reuse of Applications across Various Controllers", is hereby incorporated by reference. Application Ser. No. 12/650,497, filed Dec. 30, 2009, entitled "An Approach for Switching between Point Types without Affecting Control Logic", is hereby incorporated by reference. Application Ser. No. 12/650,513, filed Dec. 30, 2009, entitled "Changeable BACnet Interface", is hereby incorporated by reference.

BACKGROUND

The invention pertains to controllers and particularly to communications between controllers.

SUMMARY

The invention is a graphical approach for setting up a data sharing system between two controllers. Devices representing controllers maybe dragged and dropped onto a wiresheet. The devices may be connected with a line for linking the devices. This information may be downloaded to the respective controller to effect a binding between the controllers for data sharing and communication.

DESCRIPTION

Setting up data communications between controllers, for instance BACnet (Bacnet) controllers, can be a tedious task. Typically, in such a task, engineering tools may force users to setup several levels of mapping by populating multiple tables. Getting a concise picture of current links between controllers can be very difficult. This sometimes contributes to an engineer setting up wrong connections and as a result possibly adding to the total engineering and installation costs. BACnet is a communications protocol for building automation and control networks.

The present approach is a graphical approach for creating data sharing between controllers. This approach may allow a user to create links between two controllers using a graphical tool and to visualize the links between controllers. The user may simply connect two controllers by dragging/drawing a line between them and specifying the source and destination items. This approach appears similar to a mechanism used for creating control logic. For instance, a user may drag and drop objects and connect them with line to set up control logic. The user may use such an approach for setting up links between controllers also. The present approach may provide consistent user experience and make setting up of data sharing an intuitive and easy task.

The NiagaraAx™ (NiagaraAx or Niagara) software framework from Tridium, Inc., may permit a construction of new items or objects and a definition of rules which control how these items or objects can be linked with each other. The NiagaraAx framework may also provide a wiresheet that permits items or objects to be placed graphically on the wiresheet and viewed so that lines representing or effecting links can be graphically drawn to each other.

A BACnet Spyder™ (Spyder) programming tool from Honeywell International Inc. may take advantage of this infrastructure available in the NiagaraAx framework from Tridium, Inc., and extend it to allow a user to graphically create links between two BACnet Spyder controllers. The tool may then use this link information to compile and download binding tables to the controllers.

FIGS. 1-6 illustrate an example where graphically data sharing between BACnet controllers may be designed and put into operation. In general, the steps involved in this sharing may include: 1) displaying BACnet controllers or devices as objects on a network-wiresheet in a screen; 2) constructing a link between the two devices; 3) selecting a source property for the respective device; 4) selecting a target property for the other device; 5) accessing a link-manager view on a screen to reveal the links provided between the devices; and 6) clicking on a "Bind" button on the screen to download the link to the respective controllers to effect a binding between them.

Figure 1:
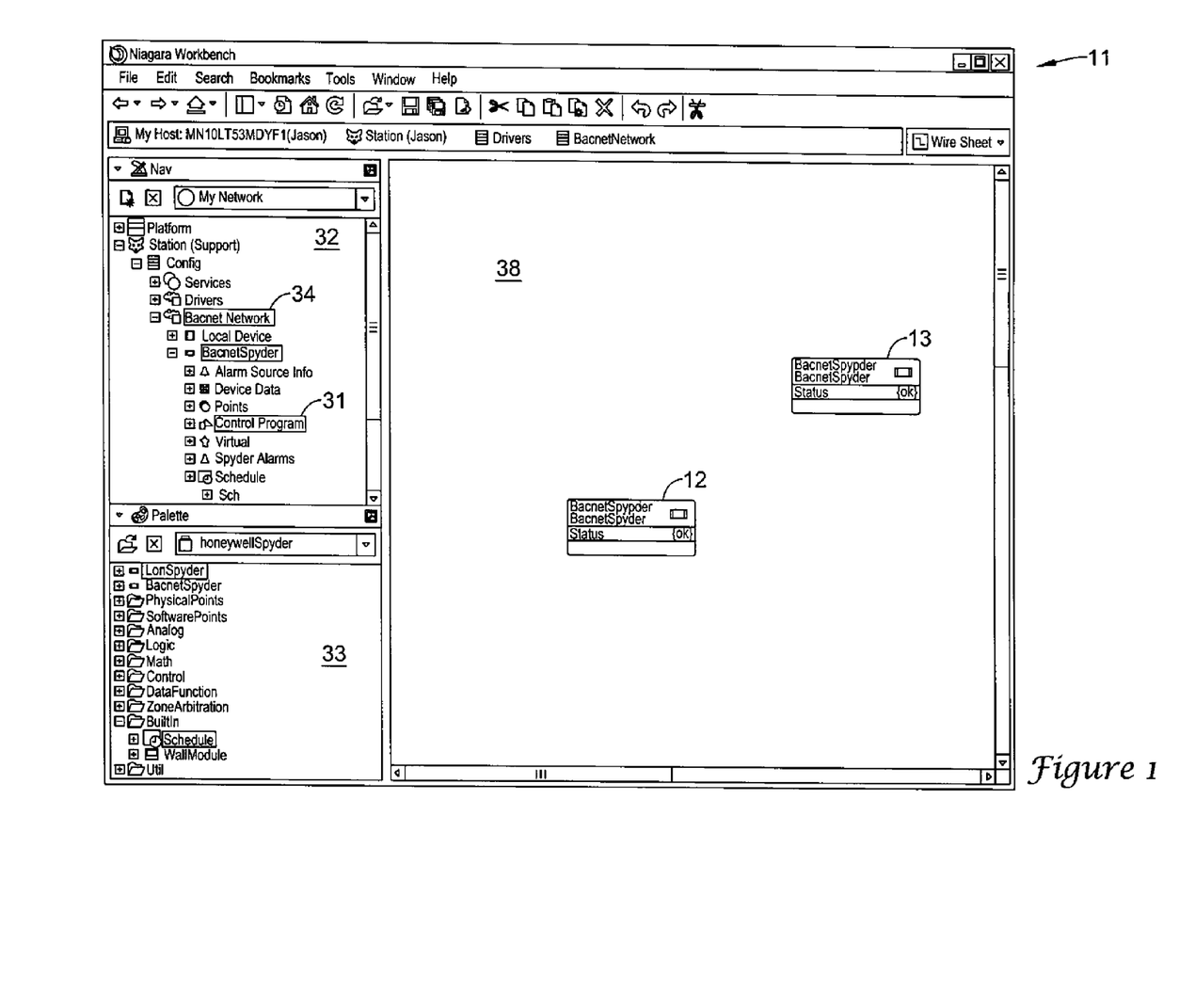
FIG. 1 is a diagram showing devices displayed as objects on a network wiresheet.
Figure 2:
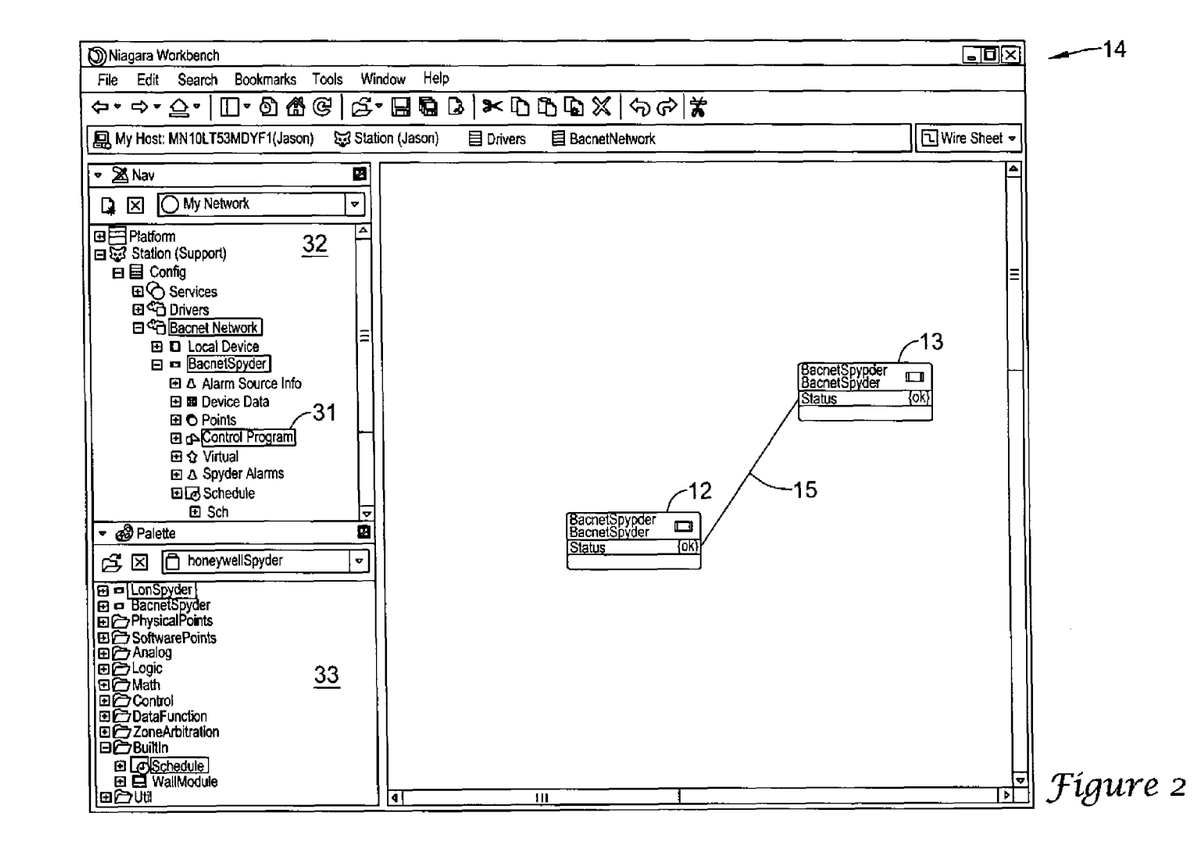
FIG. 2 is a diagram showing a link connecting devices shown in FIG. 1.
Figure 3:
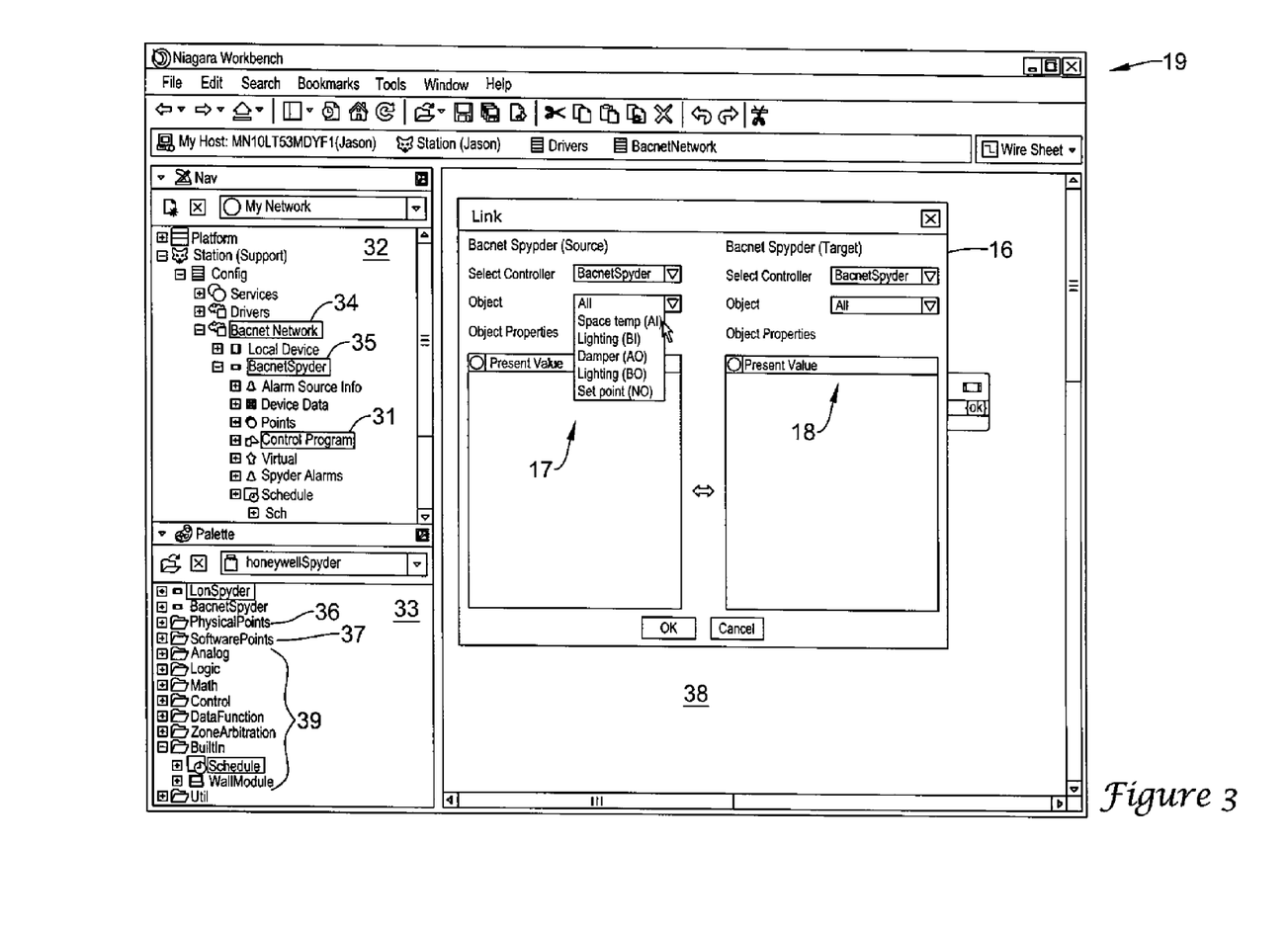
FIG. 3 is a diagram showing a dialog box for selection of a source property.
Figure 4:
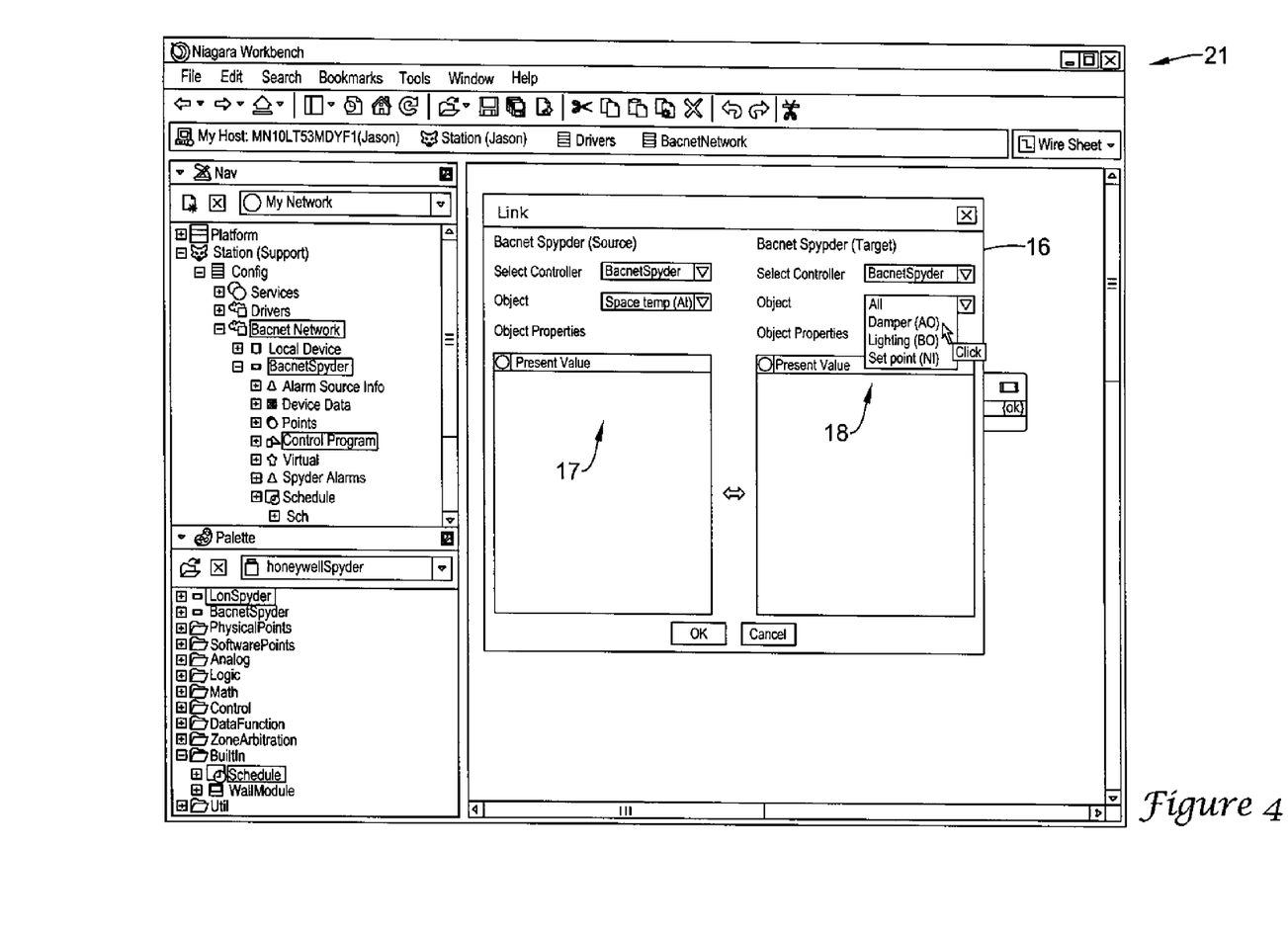
FIG. 4 is a diagram showing a dialog box for selection of a target property.
Figure 5:
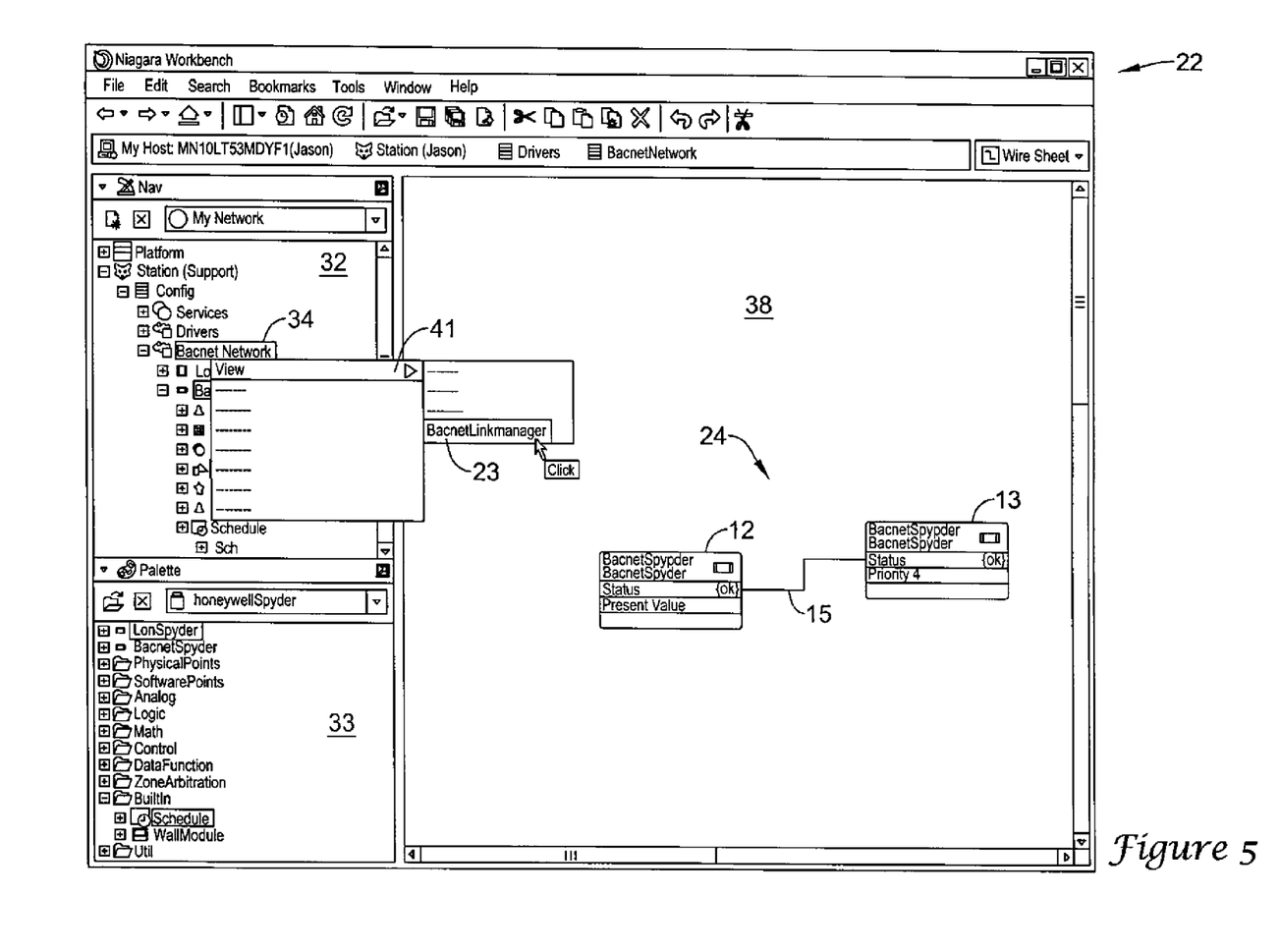
FIG. 5 is a diagram of a screen for viewing links among devices.
Figure 6:
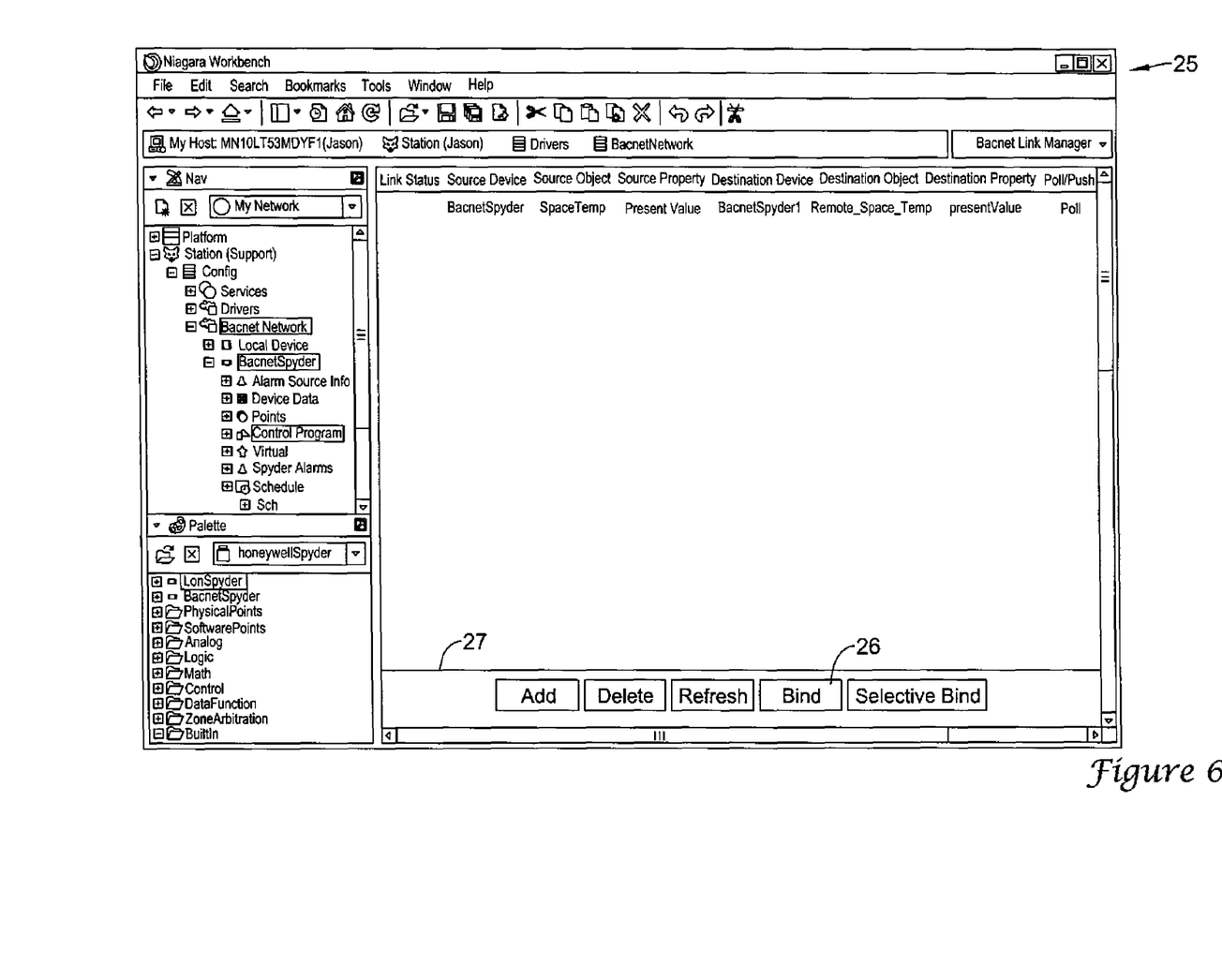
FIG. 6 is a diagram of a screen on which a button may be clicked for downloading links to the controllers.

FIG. 1 is a print of a screen 11 of a Niagara™ (Niagara) workbench where two BACnet devices are displayed as objects 12 and 13 on a network-wiresheet 38. This display of the devices may be regarded as a step 1 of graphical data sharing. For step 2, a link 15 may be graphically added between devices 12 and 13, as shown in a screen 14 of FIG. 2. This step may launch a link dialog box 16 which displays the BACnet device 12 as a selected source controller and the other BACnet device 13 as a selected target controller with source and target properties, 17 and 18, respectively, as shown in a screen 19 of FIG. 3. A source property 17, for example, "Space temp (AI)", may be selected with a click at step 3. A target property 18, for example, "Damper (AO)", may be selected with a click at step 4 as shown in screen 21 of FIG. 4.

"BACnet Network" 34 in palette 32 may be clicked to get a view 41, and view 41 may be clicked to get a list of views including one of a BACnet link manager 23. BACnet link manager 23 may be clicked, at step 5, to access a link manager view 24, as shown in screen 22 of FIG. 5, for one to see the links created. At step 6, in screen 25 of FIG. 6, a "Bind" button 26 in a drop down menu 27 for BACnet may be clicked on to download the link to the controllers.

Data sharing is the terminology that may be used for bindings in case of BACnet devices. To bind two BACnet devices in a Spyder tool (described herein), one may: 1) right-click "Bacnet Network" 34 in the Nav (navigation) palette 32 and select "Views>Wiresheet" (devices on the Bacnet network 34 may be displayed as containers on the wiresheet); 2) right-click the source device container and select "Link Mark"; 3) right-click the destination device container and select "Link To" (the "Link" dialog box 16 may appear); 4) click the object of the source controller that one wants to link (the pane showing the destination objects may highlight the objects with which one can bind the source object); 5) select the object from the destination device pane to which one wants to link the source object (one may note that the object properties of the source device show present value; this may imply that the present value of the object input or object output is taken as input to the control logic; the object properties of the destination device may show present value for all objects except AO (analog output) and BO (binary output); when an AO or BO object is selected as a destination object, object properties may display a priority array index from 1 to 16 (other numbers or criteria may be used for an index); one may set the priority value for the destination object; if an AO and a BO object are set as the source objects, then their present value may be taken as input to drive the logic); 6) click OK (a link may appear on the wiresheet between the source and destination controllers); 7) right-click BACnet Network in the Nav palette and select "Views>BACnet Link Manager" (a row providing the link details may appear); and 8) select the row and click Bind to complete binding objects between a source and destination controller.

When one performs the operations such as, add/delete/modify network objects in the control program, the changes are not necessarily reflected to BACnet object references under the BACnet Spyder device until one clicks on "Generate Network Objects". The generating network objects option may recreate the BACnet object references under the device as per the BACnet objects under the control program of that device. One does not necessarily have to be online for the Spyder device to use this option. One may set up offline BACnet data sharing links involving Spyder devices and bind the devices when the Spyder devices are online. This feature may be of use for offline engineering.

Using a BACnet link manager view, one may manage the binding of Spyder devices. The view may also provide the link details of the BACnet devices. The following link details may be displayed in the BACnet link manager view. Link status may display the current status of each link as new link, bound, or obsolete. Device status may display the status of the device as synch, out-of-synch, or offline. If the device status is synchronized, it may indicate that the bindings are downloaded to the controller. Out-of-synch may indicate that the download is pending. If the device status is offline, it may indicate that the device is not downloaded to the controller.

Source device may display the name of the source BACnet device whose output is linked or bound to the destination BACnet device. Source object may display the name of the BACnet object in the source device. The source property may display the object property of the source object. The destination device may display the name of the destination BACnet device. The destination object may display the name of the BACnet object in the destination device. The destination property may display the object property of the destination object. The object property of the destination device may show the present value for all objects, except AO and BO. When an AO or BO object is selected as a destination object, destination property may display the priority selected.

As to poll or push, the Spyder BACnet devices may use a poll/push mechanism to share data on the network. Each Spyder BACnet device may have one poll table and one push table, the size of each being, for an illustrative example, 256. The tool may automatically decide the poll/push mechanism when one adds a link. The push table on the source Spyder may be filled first and when there are no spare entries in the push table, the poll table on the destination device may be used. When there is binding between a Spyder and a third party device, the push/poll table on the Spyder device may be used depending on whether it is a source or a target device. The status poll may imply that the target device would poll the value periodically from the source device used in binding. The interval for polling may be the update rate configured on the destination object. The status push may imply that the source device would push the value periodically to the target device. The interval for pushing the data may be the GPU (Guaranteed Periodic Update) interval configured on the source object.

To open or access the BACnet link manager view, one may right-click a BACnet network in the Nav tree and select View>BACnet Link Manager. The following commands may be available in the BACnet link manager view. One may click "Add" to bind two BACnet Spyder devices, or bind a BACnet Spyder device and a third party BACnet device.

One may click "Delete", to delete the links from the database. The link status may change to obsolete after the deletion, to indicate that the link is deleted only in the database. One may click "Bind", to remove the binding information from the controller.

One may click "Refresh", to refresh the status of the bindings between the devices. The link status may displayed as new link, bound, or obsolete, depending on whether the link is downloaded to the device or is yet to be downloaded.

One may click "Bind", to download the binding information to the devices. The link status may be updated, after the bind option is invoked. One may click "Selective Bind", to download the binding information selectively to one or more devices.

One may click "Learn Link(s)", to learn the binding information from the devices. The link status may be updated, after the binding information is retrieved from the device. Upon clicking learn link(s), the obsolete links may be marked as bound. The new links that are not yet downloaded to the controller may be retained.

At any point, for the learn link to restore the link status from a BACnet Spyder device, the device should be in downloaded state, that is, the application in control program of the source device in Niagara should match that in the online device. Otherwise learn link(s) does not necessarily learn links from that device. The application in the target device involved in data sharing in Niagara does not necessarily have to match that in the online device.

One may click "Clear Bindings" to clear all the links from the device. The links that are in bound and obsolete states may be marked as "New Link".

Types of link status may be noted. Each link or binding in the BACnet link manager view may appear with a status in the link status column. The links may show one of the following statuses, assuming there is no error. "New Link" may regard links created between two or more devices and not downloaded to the device. "Bound" may regard links created between two or more devices and downloaded to the device. On clicking the "Bind" button on the BACnet Link Manager view, the links with a status as "New Link" may be converted to "Bound".

"Obsolete" may regard links downloaded to the device and deleted. Links with a status as bound may be changed to obsolete when one clicks the delete button on the BACnet link manager view. On clicking the "Bind" button on the BACnet link manager view, links with a status as obsolete may be deleted.

As to error conditions, errors and warnings may occur while attempting to change or modify data when the devices are bound. The following are some of the error conditions. After the devices are bound, a break in communication between the devices may cause a network communication alarm, which is displayed in the error view. If the GPU rate of the source or target device is changed after the links are downloaded to the device, then a warning message may appear suggesting that one download the links once again to the device. In the BACnet link manager view, the links with the status as bound may be changed to new link.

If the GPU rate on the source is greater than the update rate on the target, a warning message may appear. When changing a point type which results in the change of the BACnet object type, a warning message may appear to delete the links. It might not be possible to bind the new object type with the existing objects.

When editing BACnet objects from the object configuration view, the links with status as bound may be changed to new link. If the source and target devices are third party devices, an error message may appear.

"Add Bindings" may allow one to bind two devices wherein at least one device is a BACnet Spyder device. One may bind two devices in one of the following ways—a BACnet Spyder source device with a BACnet Spyder destination device, a BACnet Spyder source device with a third party destination, and a third party source device with a BACnet Spyder destination device.

The following may be performed to bind two BACnet Spyder devices: 1) select a BACnet Spyder source device from the device list; 2) select the source object from the object list; 3) select present value from the property list; 4) select a BACnet Spyder destination device from the device list; 5) select the destination object from the object list; 6) select present value from the property list when the destination object type is AV, BV, and MSV, or select the priority value from the property list when the destination object type is AO or BO (a priority value from 1 to 16 may be set for the destination object); and 7) click OK to bind the two devices. It may be noted that the priority index selected for binding in case of a destination device should be different from the priority index being driven by the control program logic.

One may perform the following to bind a BACnet Spyder source device with a third party destination device: 1) select a BACnet Spyder source device from the device list; 2) select the source object from the object list; 3) select present value from the property list; 4) select a third party destination device from the device list; 5) select the destination object type from the list; 6) type the object instance number in the object ID text box (a default object name may be provided for the destination object and the object name can be edited); 7) select present value from the property list when the destination object type is AV, BV, and MSV, or select the priority value from the property list when the destination object type is AO or BO (a priority value from 1 to 16 may be set for the destination object); and 8) click OK to bind the two devices.

The following may be performed to bind a third party source device with a BACnet Spyder destination device: 1) select a third party source device from the device list; 2) select an object type from the list; 3) type the object instance number in the object ID text box (a default object name may be provided for the destination object and the object name can be edited); 4) select present value from the property list (the present value of the source object is taken by default); 5) select a BACnet Spyder destination device from the device list; 6) select the destination object from the object list; 7) select present value from the property list when the destination object type is AV, BV, and MSV or select the priority value from the property list when the destination object type is AO or BO (a priority value from 1 to 16 may be set for the destination object); and 8) click OK to bind the two devices. The priority index selected for binding, in case of a destination device, should be different from the priority index being driven by the control program logic. Binding cannot necessarily be done if both source and destination devices are third party BACnet devices. An error message, "Cannot create the link. Both are non-bindable devices." may appear, if one tries binding two third party devices.

Binding JACE™ (JACE, Jace or Java Application Control Engine) and Spyder may be noted. A Jace may behave as a BACnet device. Points from Spyder and other third party devices may be exported to the Jace to be monitored. The points in the Jace may be monitored by setting up a binding between the Jace and Spyder. This may reduce the number of polls needed to read or write values to the point.

A Spyder tool may offer a graphical environment to program the BACnet Spyder controller. One may use the wiresheet view 38 in the engineering mode to use physical points 36, software points 37, and function blocks 39 to build an application in control program 31 which may be accessed from a Nav palette 32 like that shown in FIG. 1. The physical points 36, software points 37, and function blocks 39 may be accessed using a palette 33. One may drag these items on to the wiresheet 38 and connect them, based on one's need, to develop application logic. The logic that one creates may then be stored in a Spyder library for reuse. Upon being satisfied with the logic one has created, one may download the logic to the controller. The logic thus created may be tested for correctness using the simulation and online debugging modes.

Changing NCI (network configuration input) values, configuration of a schedule block, or daylight savings option, may put the application in a quick download pending state. As long as the application has been downloaded at least once to the controller, these changes may just trigger a quick download to the controller.

One may use the control program option to program the Spyder tool. To do this, one may expand the BACnet Spyder 35 in the Nav palette 32 and double-click control program 31 to display the wiresheet view 38; display the palette (from the menu bar, select Window>Sidebars>Palette to display the palette).

The palette 32 may appear on the left pane with the following items. BACnet Spyder 35 is a device that one may drag on to the BACnet Network 34 in the Nav palette 32 to create a new device. It may be noted that one cannot drop this on to the wiresheet of any macro or control program or application. Physical points 36 may be modulating and binary inputs or outputs. Software points 37 may be used to create a network input, network setpoints, or a network output.

Additional items may include function blocks 39 such as analog function blocks, logic function blocks, math function blocks, control function blocks, data-function function blocks, zone arbitration function blocks, and built-in function blocks, available from palette 33.

It may be noted that a macro may be a group of functional blocks grouped together that define a specific functionality. Commonly used program elements may be defined as macros so that they could be reused across applications. An application may include macros and logic that one can define and use in applications. Standard applications may be provided for the Spyder used to build application logic One may drag any of these noted items on to the wiresheet 38 of a control program 31 in its engineering mode and make the connections between physical points 36, software points 37, and function blocks 39 to create a control program or an application.

A wiresheet view 38 may be used to drag the physical points and function blocks to build the application logic. One may save a logic created to be used later and also shared with other users. One may build several applications and store them in a Spyder library along with standard applications.

After one has created the application logic and tested the logic using the simulation feature, the application logic may be downloaded to the controller. To download the application logic, one may: 1) on the Nav palette 32, right-click the device and select Actions>Download (the download dialog box may appear); and 2) select true under full download for a full download or select false for a quick download. One may note that a quick download just downloads the modified items from a previous download where as with a full download the entire configuration may be downloaded to the controller replacing the existing configuration. However, if changes have been made to the SBus (Sylk or sensor bus) wall module by an operator/tenant locally from the display on the wall module, and a full download is performed, the Spyder tool may download the entire configuration to the controller except the SBus wall module configuration. This may be done to avoid losing any changes made locally on the SBus wall module during a download operation. Then 3), one may click OK. The application logic may be downloaded to the controller based on your selection.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A graphical method for setting up data sharing between controllers comprising:
    dragging and dropping two or more BACnet devices on a network wiresheet in a graphic display;
    specifying one or more devices as a source device;
    specifying one or more devices as a destination device;
    drawing a line between a source device and a destination device to construct a link between the source and destination devices and wherein drawing the line between the source device and the destination device to construct a link between the source and destination devices automatically launches a dialog box which displays source and destination properties;
    selecting a source property for the source device;
    selecting a destination property for the destination device;
    binding the source and destination devices having a link between them; and
    accessing a link-manager view in the display to observe the devices and links constructed among them;
    wherein each of the two or more BACnet devices represents a respective BACnet controller;
    wherein binding the devices comprises downloading the devices and links to the respective controllers that the devices represent to establish a basis for data sharing between the controllers; and
    wherein:
        the source property is selected from a group consisting of space temperature, lighting, damper, set point and the like;
        the destination property is selected from a group consisting of space temperature, damper, lighting, set point, and the like.

2. The method of claim 1, wherein the BACnet devices have a first protocol.

3. The method of claim 2, wherein the wiresheet that permits dragging and dropping two or more devices having a first protocol on a network wiresheet in a display is provided by a Niagara™ software framework.

4. The method of claim 2, wherein the devices are BACnet Spyder™ devices.

5. A method for graphically linking controllers comprising:
    placing a first symbol representing a first controller and a second symbol representing a second controller on a graphic screen;
    drawing a line that connects the first and second symbols together;
    designating the first symbol as a source object;
    designating the second symbol as a destination object;
    designating the line as a link between the source object and the destination object;
    automatically launching a menu that displays source and designation properties for selection as a result of drawing the line that connects the first and second symbols together;
    selecting a property for the source object;
    selecting a property for the destination object; and binding the first and second objects by downloading to the respective first and second controllers, appropriate information indicative of the link and to provide a basis for data sharing between the source and destination objects; and
    accessing a link-manager viewer on the screen to obtain a status of the link; and
    wherein:
        the source property is selected from a group consisting of space temperature, lighting, damper, set point and the like; and
        the destination property is selected from a group consisting of damper, lighting, set point, and the like.

6. The method of claim 5, wherein a first protocol is that for BACnet Spyder™ controllers.

7. The method of claim 6, wherein the graphic screen comprises a wiresheet provided by a Niagara™ software framework.

8. A graphical system for setting up data sharing between controllers comprising:

two or more BACnet devices on a network wiresheet in a graphic display, wherein one or more BACnet devices are specified as a source device, and wherein one or more BACnet devices are specified as a destination device;

a line extending between a source device and a destination device, wherein the line constructs a link between the source and destination devices and wherein drawing the line between the source device and the destination device to construct a link between the source device and the destination device automatically launches a dialog box which displays source and destination properties;

a link-manager view in the display displays the devices and links constructed among them;

wherein the source device has a source property selected from a group consisting of space temperature, lighting, damper, set point, and the like;

wherein the destination device has a destination property selected from a group consisting of space temperature, damper, lighting, set point, and the like;

wherein the link is effected to bind the source device and the destination device and binding the source device and the destination device comprises downloading the devices and links to their respective controllers that the devices represent to establish a basis for data sharing between the controllers; and wherein each of the two or more BACnet devices represents a respective BACnet controller.

9. The system of claim 8, further comprising:
a dialog box which displays source properties and destination properties.

10. The system of claim 8, wherein:
the wiresheet permits dragging and dropping two or more devices having a first protocol on a network wiresheet in a display; and the wiresheet is provided by a Niagara™ software framework.

* * * * *